US012615089B2

(12) United States Patent
Mohs

(10) Patent No.: US 12,615,089 B2
(45) Date of Patent: Apr. 28, 2026

(54) TERRESTRIAL REPEATER AND OPTIMIZED REPEATER SPACING

(71) Applicant: SUBCOM, LLC, Eatontown, NJ (US)

(72) Inventor: Georg Heinrich Mohs, East Brunswick, NJ (US)

(73) Assignee: SubCom, LLC, Eatontown, NJ (US)

( * ) Notice: Subject to any disclaimer, the term of this patent is extended or adjusted under 35 U.S.C. 154(b) by 1160 days.

(21) Appl. No.: 17/395,717

(22) Filed: Aug. 6, 2021

(65) Prior Publication Data

US 2022/0045760 A1     Feb. 10, 2022

Related U.S. Application Data

(60) Provisional application No. 63/063,922, filed on Aug. 10, 2020.

(51) Int. Cl.
*H04B 10/297* (2013.01)
*H01S 3/067* (2006.01)
*H04B 10/293* (2013.01)

(52) U.S. Cl.
CPC ......... *H04B 10/297* (2013.01); *H04B 10/293* (2013.01); *H01S 3/06704* (2013.01); *H01S 3/06754* (2013.01)

(58) Field of Classification Search
CPC . H04B 10/293; H04B 10/297; H04B 10/2935
See application file for complete search history.

(56) References Cited

U.S. PATENT DOCUMENTS

| | | | |
|---|---|---|---|
| 5,808,789 A | 9/1998 | Edagawa et al. | |
| 6,587,259 B2 | 7/2003 | Islam et al. | |
| 8,792,784 B2 | 7/2014 | Wellbrock et al. | |
| 2002/0024706 A1* | 2/2002 | Meli ................. | H04J 14/02216 |
| | | | 398/141 |
| 2002/0181045 A1* | 12/2002 | Uda .................... | H04J 14/0305 |
| | | | 359/337.13 |

(Continued)

FOREIGN PATENT DOCUMENTS

| | | |
|---|---|---|
| JP | H05265061 A | 10/1993 |
| JP | 2006013561 A | 1/2006 |
| WO | 2020132070 A1 | 6/2020 |

OTHER PUBLICATIONS

Ibrahimi et al., "Minimum-Cost Optical Amplifier Placement in Metro Networks", Journal of Lightwave Technology, vol. 38 Issue : 12, pp. 3221-3228, published Jun. 15, 2020. (Year: 2020).*

(Continued)

*Primary Examiner* — Eric L Bolda
(74) *Attorney, Agent, or Firm* — KDW Firm PLLC

(57) ABSTRACT

Disclosed are a system and a method for configuring an optical transmission system. A process may include arranging a first ruggedized repeater on or in a first object or structure. A second ruggedized repeater may be arranged on or in a second object or structure different from the first object or structure. A third ruggedized repeater may be arranged on or in a third object or structure different from the first and second objects or structures, wherein: (i) a first distance between the first ruggedized repeater and the second ruggedized repeater and (ii) a second distance between the second ruggedized repeater and the third ruggedized repeater are equal or nearly equal and based on signal loss.

12 Claims, 6 Drawing Sheets

(56)        References Cited

U.S. PATENT DOCUMENTS

| 2004/0146302 | A1* | 7/2004 | Balland .............. H04B 10/2935 |
| | | | 398/94 |
| 2006/0067702 | A1* | 3/2006 | Alicherry ......... H04B 10/07955 |
| | | | 398/160 |
| 2007/0183022 | A1 | 8/2007 | Abbott |
| 2008/0285116 | A1 | 11/2008 | Abbott |
| 2012/0237215 | A1 | 9/2012 | Wellbrock |
| 2020/0195413 | A1 | 6/2020 | Bowler et al. |

OTHER PUBLICATIONS

European Search Report for EP Application No. 21856488.8, dated Jan. 3, 2024, 10 pages.
International Search Report and Written Opinion dated Dec. 1, 2021, for the International Patent Application No. PCT/US2021/045141, filed on Aug. 9, 2021, 11 pages.
Telecommunications Engineering and Construction Manual (United States. Rural Electrification Administration) Dec. 1982 (Dec. 1982) [online] (retreived from the internet on Oct. 20, 2021) KURL https://books.google.com/books?id=fEtHAQAAIAAJ&pg=PT279 &1pg=PT279&dq=span+distance+for+repeaters&source=bl&ots= H4NPjoTvcU&sig=ACfU3UOcyS-.

* cited by examiner

DISTANCE BETWEEN AMPLIFIERS

TERRESTRIAL FIBER OPTIC CABLE

RAMAN PUMP

TERRESTRIAL AMPLIFIER
210

TERRESTRIAL AMPLIFIER

208

206

204

202

200

300

600

TERRESTRIAL REPEATER AND OPTIMIZED REPEATER SPACING

CROSS-REFERENCE TO RELATED APPLICATION

The present application claims priority to U.S. Provisional patent application No. 63/063,922, filed Aug. 10, 2020, entitled "TERRESTRIAL REPEATER AND OPTIMIZED REPEATER SPACING", and incorporated by reference herein in its entirety.

TECHNICAL FIELD

Embodiments of the present disclosure relate to the field of optical communication systems. More particularly, the present disclosure relates to an improved repeater and techniques for optimizing the spacings between repeaters in optical communication systems.

BACKGROUND

Typically, "huts" may be physical structures that house system hardware or equipment, such as amplifiers, that may be used to extend one or more portions of a terrestrial optical communication system or network. Extending the terrestrial communication system or network, for instance, via the hardware or equipment in these huts may be referred to as "terrestrial extensions" and they may be required to overcome optical path losses in the system or network. Terrestrial extensions, however, are often limited in their transmission performance by non-optimized hut spacing(s). The hut spacing(s) may be dictated by the availability of real estate or location rather than for optimum transmission performance.

One solution for solving the varying optical signal loss between huts as a result of the spacing therebetween may be implementing multistage optical amplifiers with adjustable gain. This solution, however, may lead to higher noise figure and degraded transmission performance compared to single stage amplifiers. Distributed Raman amplification, which also has been used to improve system performance with high loss spans, may suffer from at least the same drawbacks. Moreover, radio transmission links or satellite connections may be used to provide network connectivity to remote areas, but these links or connections cannot provide the same broadband connectivity that can be achieved with fiber optic connections. In previous or conventional solutions, the variable and/or non-optimized hut spacings leads to non-optimized fiber optic transmission performance, and further, optimized hut spacing (e.g., due to real estate limitations) often may not be a commercially attractive solution. Moreover, broadband data transmission connections to remote areas can be cost prohibitive due to the infrastructure needed to accommodate the recurring compensation of transmission loss.

DETAILED DESCRIPTION

Figure 1:
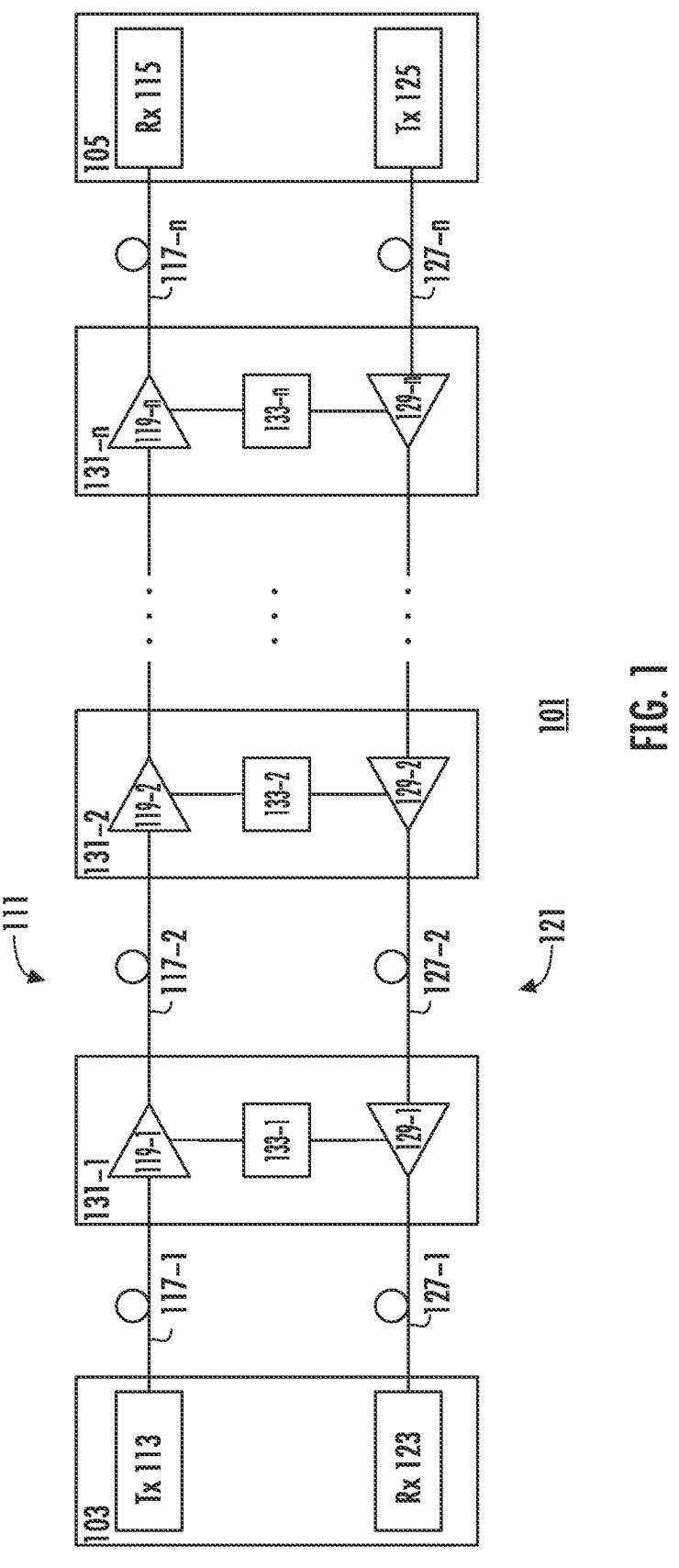
FIG. 1 illustrates an example optical communication system according to one or more embodiments.

The embodiments, examples, features, figures, etc. described and presented herein provide numerous advantages over the previous or conventional solutions or techniques. For example, the ruggedized repeater and the ability to arrange or configure the ruggedized repeater on any object or structure (manmade or otherwise) with nearly no restrictions (e.g., real estate limitations) allows at least even or nearly even spacing between the repeaters, which is a novel solution for cost efficient and performance optimized fiber optic transmission solutions. Accordingly, at least the disadvantages associated with the conventional solution involving multistage amplifiers with optical gain and the degraded transmission performance thereof is overcome by the embodiments, examples, features, figures, etc. described and presented herein.

The disclosed subject matter is directed to at least an improved repeater and optimizing the spacing between two of the improved repeaters in an optical communication system. For example, the improved repeater may be a ruggedized repeater, a customized repeater, or the like. The term "ruggedized" or "rugged" or "ruggedizing" may broadly refer to configuring, designing, or otherwise improving to be hard-wearing, shock-resistant or otherwise able to withstand environmental elements (e.g., temperature, moisture, wind, vibration, corrosive substances), and the like. Moreover, it may be understood that the terms: optical repeater (or repeater) and optical amplifier (or amplifier), may be used interchangeably herein. While the repeater spacing optimization techniques herein are primarily described as being used or implemented in terrestrial optical communication systems, it may further be understood that the same techniques may be applicable in undersea (such as shallow waters) optical communication systems.

According to one or more embodiments, a ruggedized repeater may be deployed, arranged, or otherwise configured on, or in, a physical structure (man-made or otherwise), such as a utility pole, utility line, manhole, etc., for instance, with nearly no restrictions on placement of the ruggedized repeater and with optimized spacing for optical transmission performance (e.g., overcome losses from pre-existing infrastructure systems or address topography issues). For example, a ruggedized repeater may be arranged on every utility pole spanning a predefined distance to obtain even or nearly even repeater spacing to address optical signal loss and optimize system signal quality and performance. In another example, a ruggedized repeater may be arranged on every other pole spanning the same distance. In yet another example, ruggedized repeaters may be arranged in manholes such that the repeaters are evenly, or nearly evenly, spaced. In a further example, a first ruggedized repeater may be arranged on or in a first type of object or structure (e.g., pole) and a second ruggedized repeater may be arranged on or in a second type of object or structure (e.g., manhole).

In further example(s), the ruggedized amplifier(s) arranged, configured, installed, etc. on the utility poles or utility lines may also be used for cost-efficient long-haul fiber optic connections, for instance, particularly if utility lines or poles already exist. Moreover, the combination of the ruggedized repeater with existing technology, such as high voltage alternate current power transmission lines, step down transformers, and/or optical cable for deployment on poles along utility lines, may enable cost effective high bandwidth fiber optic transmission systems.

The disclosed subject matter will now be described more fully hereinafter with reference to the accompanying drawings, in which preferred embodiments of the disclosed subject matter are shown. This disclosed subject matter, however, may be embodied in many different forms and should not be construed as limited to the embodiments set forth herein. Rather, these embodiments are provided so that this disclosure will be thorough and complete, and will fully convey the scope of the disclosed subject matter to those skilled in the art. In the drawings, like numbers refer to like elements throughout.

Referring to the drawings, FIG. 1 illustrates an exemplary bi-directional optical communication system 101 which may use high-bandwidth fiber optics to transmit vast amounts of data over long distances. Bi-directional data transmission may be implemented by constructing pairs of optical fibers within the optical cable and transmitting one or more channels, e.g., wavelength division multiplexed channels, per fiber pair.

As shown, the optical communication system 101 may include terminals 103 and 105 connected by two unidirectional optical paths 111, 121, which together form a bi-directional optical fiber pair. Optical path 111 may transmit information in one direction (e.g., to the right) from a transmitter 113 at terminal 103 to a receiver 115 at terminal 305. Optical path 121 may transmit information in the other direction (e.g., to the left) from a transmitter 125 at terminal 105 to a receiver 123 at terminal 103. With respect to terminal 103, the optical path 111 is an outbound path and the optical path 121 is an inbound path. The optical path 111 may include optical fibers 117-1 to 117-n and optical amplifiers 119-1 to 119-n, and the optical path 121 may include optical fibers 127-1 to 127-n and optical amplifiers 129-1 to 129-n. As set forth above, the one or more of the optical amplifiers 119-1 to 119-n and 129-1 to 129-n may also be referred to as optical repeaters. It may be understood that, in some examples, transmitter 113 and receiver 123 may be housed together as a transponder at terminal 103, and similarly, transmitter 115 and receiver 125 may also be housed together as a transponder at terminal 105.

The optical path pair (e.g., optical paths 111, 121) may be configured as a set of amplifier pairs 119-1 to 119-n and 129-1 to 129-n within repeaters 131-1 to 131-n connected by pairs of optical fibers 117-1 to 117-n and 127-1 to 127-n, which may be included in an optical fiber cable together with fibers supporting additional path pairs. Each repeater 131 may include a pair of amplifiers 119, 129 for each path pair and may include additional amplifiers for additional path pairs. The optical amplifiers 119, 129 may utilize rare earth doped fiber amplifiers (EDFAs), Raman amplifiers, or semiconductor optical amplifiers (SOAs), or other types of amplifiers. A coupling path 133-1 to 133-n may be coupled between optical paths 111, 121, for example, in one or more of the repeaters 131-1 to 131-n. It may be understood that the term "couple" or "coupled," as used herein, broadly refers to any connection, connecting, coupling, link, or linking, either a direct or indirect or a wired or wireless connection and does not necessarily imply that the coupled components or elements are directly connected to each other.

Although an exemplary embodiment of the optical communication system 101 is shown and described variations of the optical communication system 101 are within the scope of the present disclosure. The optical communication system 101 may include, for example, more optical path pairs and more or fewer repeaters. Moreover, it may be understood that the transmitters, receivers, transponders containing the transmitters and receivers, or any other suitable device for transmitting and receiving data, may be include at least one memory and one or more processors (e.g., CPU, ASIC, FGPA, any conventional processor, etc.) to execute instructions stored in memory. It may further be understood that the above-described optical paths may be powered via power conductor(s) of the optical cables. Moreover, multiple optical communication systems, such as optical communication system 101, may be interconnected via interconnect cables and other types of interconnect components.

Figure 2:
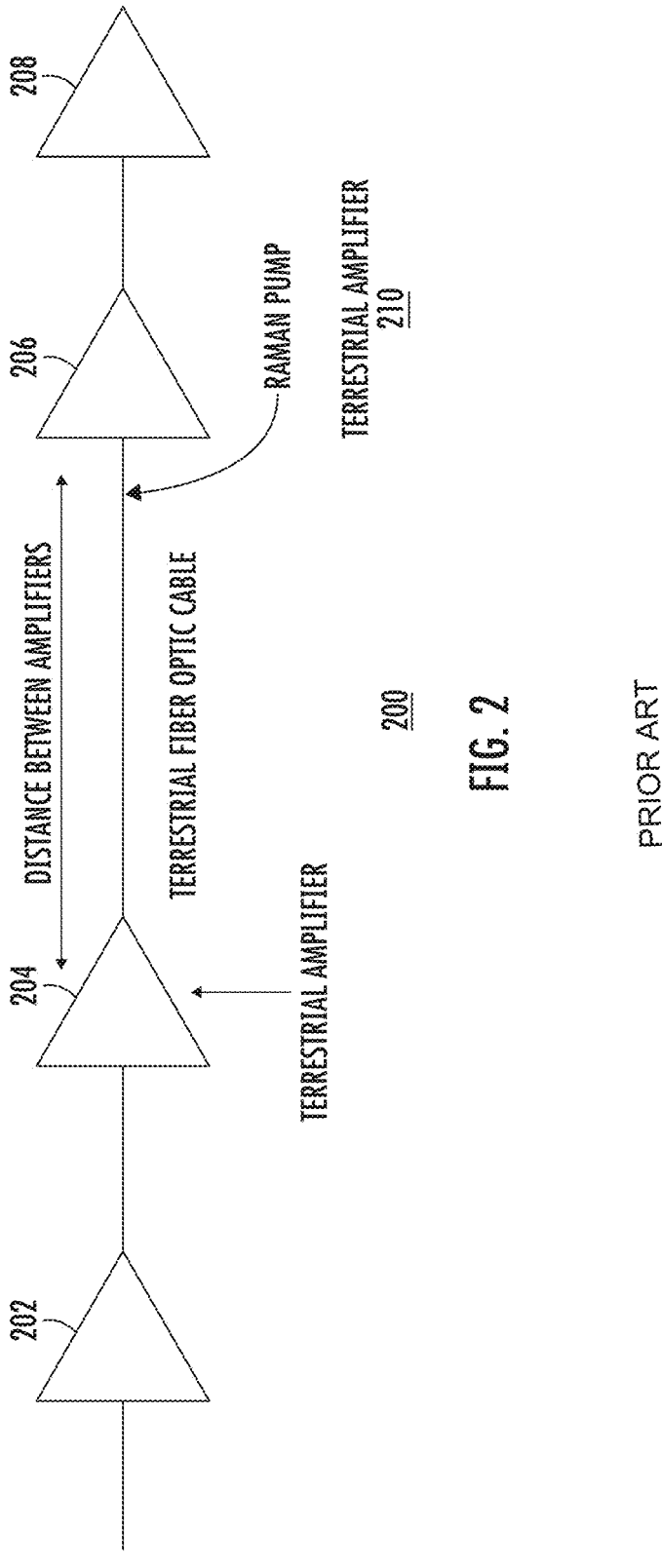
FIG. 2 illustrates uneven optical amplifier spacing.

FIG. 2 illustrates uneven optical amplifier spacing 200. As shown, a terrestrial optical communication system may include at least terrestrial optical amplifiers 202, 204, 206, and 208. The amplifiers may be arranged such that the distance between amplifiers 204 and 206 is much greater than the distances between amplifiers 202, 204 and amplifiers 206, 208. The uneven spacing between the terrestrial optical amplifiers may be result of land, location, or real estate limitations (e.g., inaccessible land, wherever physical space is available). In some instances, the uneven optical amplifier spacing can be up to 200 kilometers (km). For example, the distance between amplifiers 204 and 206 may be 200 km, while the distance between amplifiers 202 and 204 may be 65 km. Thus, the large distance between amplifiers 204 and 206 may cause optical signal transmission degradation, varying optical signal loss, and overall non-optimal performance as compared to the optical signal transmission degradation, varying optical signal loss, and overall non-optimal performance between amplifiers 202 and 204, for example.

As described above and as illustrated in FIG. 2, one solution for solving the varying optical signal loss between amplifiers 204 and 206 is using a multistage optical amplifier with adjustable gain, such as a Raman pump terrestrial amplifier 210. This, however, may lead to signal-to-noise ratio (SNR) and/or communication system performance penalties.

Figure 3:
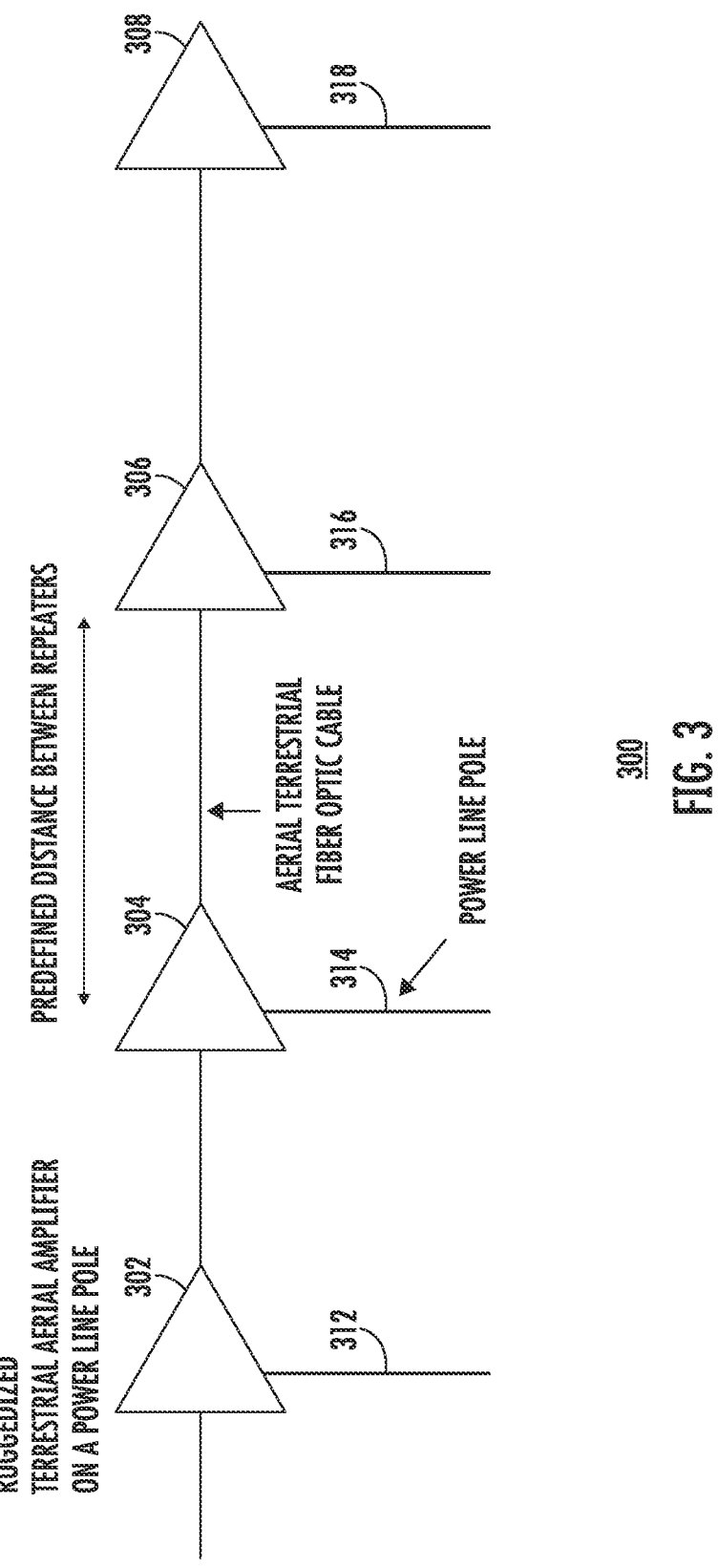
FIG. 3 illustrates a first example spacing configuration of ruggedized repeaters according to one or more embodiments.

FIG. 3 illustrates an example spacing configuration 300 of ruggedized repeaters according to one or more embodiments. As stated above, the term "ruggedized" or "rugged" or "ruggedizing" may broadly refer to configuring, designing, or otherwise improving the configuration of repeater to be hard-wearing, shock-resistant or otherwise able to withstand environmental elements, etc. Thus, for instance, a ruggedized repeater may refer to any suitable optical repeater or amplifier that has been designed or otherwise configured to be able to withstand external elements (e.g., water, moisture, wind, vibration) for a long period of time.

As shown in FIG. 3, a terrestrial optical communication system may include at least ruggedized repeaters 302, 304, 306, 308, and for example, each of the ruggedized repeaters may be arranged, placed, configured, or installed on a physical object or structure, e.g., power line poles 312, 314, 316, 318. The ruggedized repeaters may be referred to as ruggedized terrestrial aerial amplifiers. By at least arranging according to signal loss, such as 20 dB signal loss, the ruggedized repeaters 302, 304, 306, 308 on the power line poles 312, 314, 316, 318, even (or nearly even) spacing can be achieved between the repeaters. Signal loss along the optical cables may be determined using known techniques and devices. For example, different types of optical fibers may have different expected losses. A single mode fiber (SMF) using a source at around 1550 nm is used for long haul data optical communications. In such an example, the SMF loss variations between 0.18 and 0.25 dB/km are common, and, at a distance of 50 km, the SMF loss may be as great as 3.5 dB. In addition, when new fiber optic cables are spliced whether to another new fiber optic cable or a pre-existing fiber optic cable there is signal loss at the splice site which contributes to the overall signal loss calculation which is accounted for in the predetermined distance determination.

It may be understood that the placement of the ruggedized repeaters may such that a predetermined or predefined distance or spacing between the repeaters is achieved. Alternatively, or in addition to the predetermined distance or spacing being defined by kilometers, miles or the like, the predetermined distance or spacing may be defined by signal loss, in dB, for example. In an example, a set signal loss may be 20 dB or the like. The distance or spacing may be a distance or spacing that allows optimal transmission performance (e.g., minimized signal loss) for the terrestrial optical communication system. Further, the distance or spacing may be chosen to at least minimize the impact on the optical signal-to-noise ratio (SNR) associated with system. In the configuration 300, the first distance between the first ruggedized repeater 302 and the second ruggedized repeater 304 may be based on a signal loss between the first ruggedized repeater 302 and the second ruggedized repeater 304. Similarly, a second distance (e.g., predefined distance) between the second ruggedized repeater 304 and the third ruggedized repeater 306 may be based on a signal loss between the second ruggedized repeater 304 and the third ruggedized repeater 306, and so on for the fourth ruggedized repeater 308. For example, in the spacing configuration 300, the signal loss between the second ruggedized repeater 304 and the third ruggedized repeater 306 may be equal to or nearly equal to the signal loss between the first ruggedized repeater 302 and the second ruggedized repeater 304. Moreover, in some examples, power may be locally supplied to one or more of the ruggedized repeaters 302, 304, 306, 308 with or using step-down transformers. It may be understood that the step-down transformers may be existing component (s) of the power line infrastructure.

Figure 4:
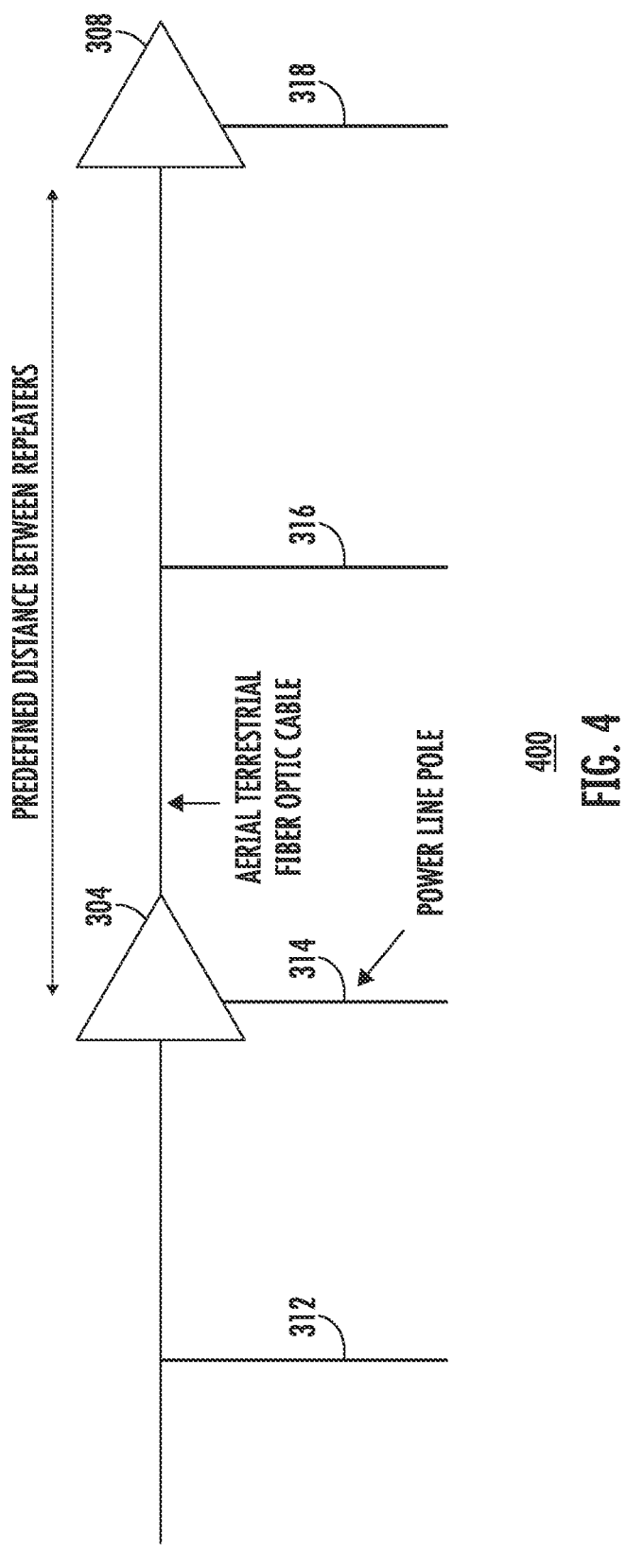
FIG. 4 illustrates a second example spacing configuration of ruggedized repeaters according to one or more embodiments.

FIG. 4 illustrates an example spacing configuration 400 of ruggedized repeaters according to one or more embodiments. For ease of explanation, the ruggedized repeaters and power line poles of FIG. 3 are also used to describe the spacing configuration 400 of FIG. 4. As shown, the spacing configuration 400 is different than the spacing configuration 300.

In spacing configuration 400, a ruggedized repeater may be arranged, placed, installed, or otherwise configured on every other power line pole when signal loss is determined to be approximately 20 dB or the like from a previously installed repeater. For example, ruggedized repeater 304 may be arranged on power line pole 314 and ruggedized repeater 308 may be arranged on power line pole 318. No ruggedized repeaters may be arranged on power line poles 312 and 316. Thus, for instance, even though the predetermined distance or spacing between the repeaters in configuration 400 is greater than the repeater spacing in configuration 300, the spacings between the ruggedized repeaters may still be even or nearly even according to the determined signal loss.

Figure 5:
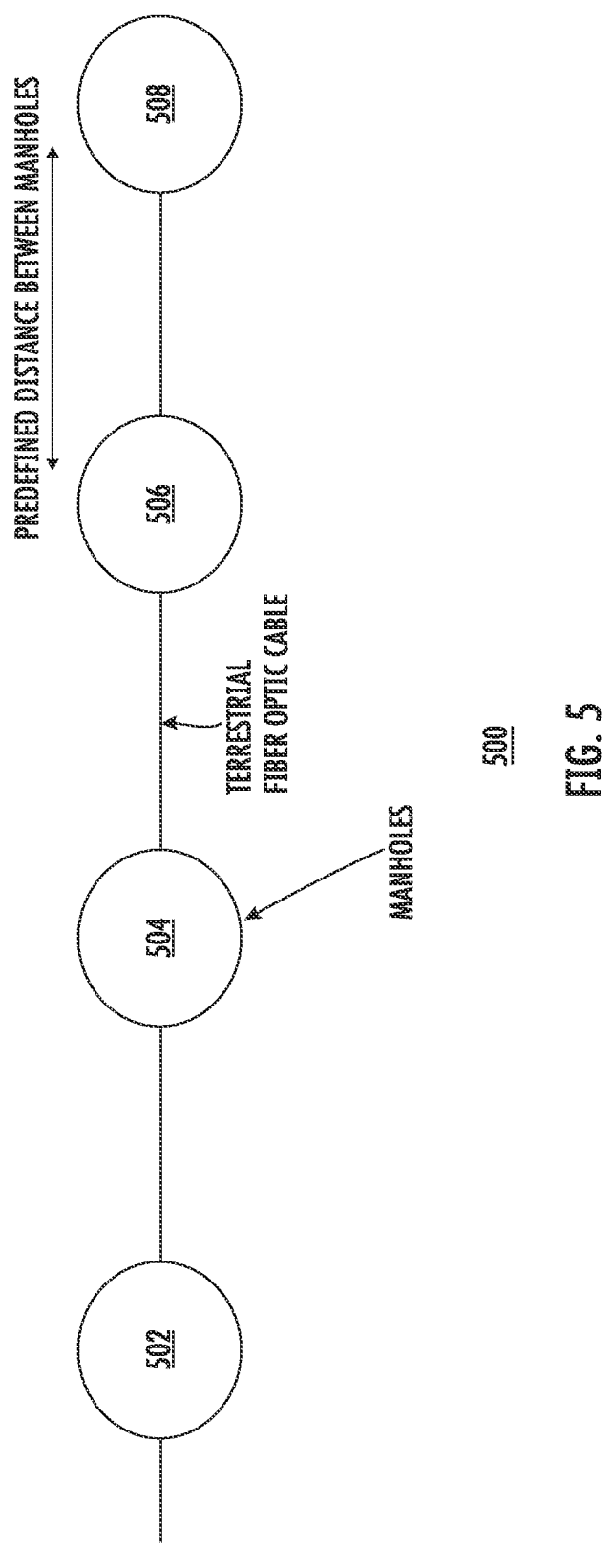
FIG. 5 illustrates a third example spacing configuration of ruggedized repeaters according to one or more embodiments.

FIG. 5 illustrates an example spacing configuration 500 of ruggedized repeaters according to one or more embodiments. In configuration 500, ruggedized repeaters may be arranged, placed, installed, or configured on or in objects or structures closer to the ground, such as manholes 502, 504, 506, 508. It may be understood, similar to the power line poles illustrated in FIGS. 3 and 4, the spacings between the manholes 502, 504, 506, and 508 are even or nearly even. A ruggedized repeater (not shown) may be arranged or installed in each of the physical structure of the manholes 502, 504, 506, and 508, which forms a predetermined repeater spacing between at least two of the ruggedized repeaters. The predetermined repeater spacing may be determined according to signal loss.

The term "manhole" may broadly refer to any opening to a confined space, such as a shaft, utility vault, or vessel and may be access points for underground public utility, inspection, maintenance, system upgrades, or the like. Moreover, it may be understood that similar to FIG. 4, the predetermined spacing between the ruggedized repeaters may be customized, e.g., arranging or configuring a ruggedized repeater in every other manhole, etc.

Figure 6:
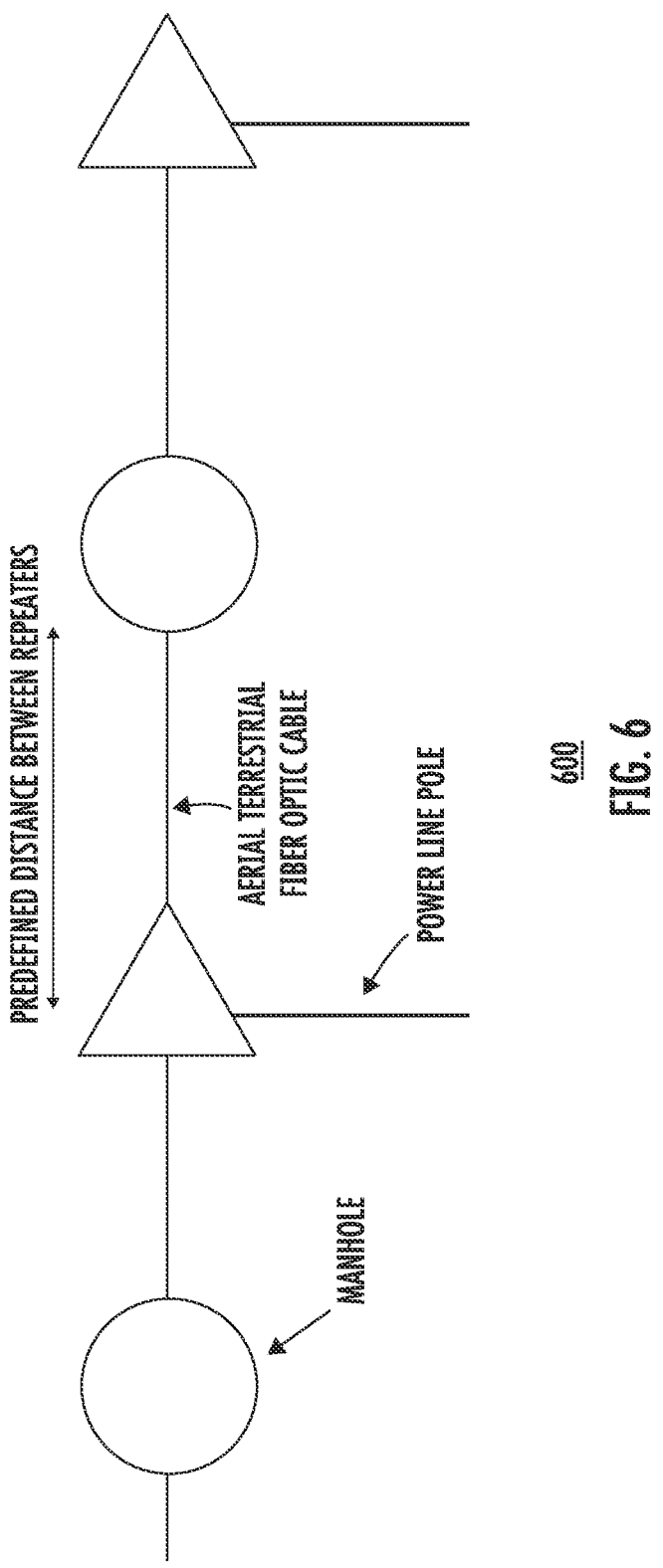
FIG. 6 illustrates a fourth example spacing configuration of ruggedized repeaters according to one or more embodiments.

FIG. 6 illustrates an example spacing configuration 600 according to one or more embodiments. For example, the spacing configuration 600 may involve the arrangement of ruggedized repeaters on differing objects or structures, such as both a power line pole and a manhole. To at least that end, the configuration 600 may be referred to as a mixed configuration.

In some examples, even spacing or nearly even spacing between repeaters based on signal loss may be able to be achieved by placing the ruggedized repeaters on different objects or structures. As shown, a first ruggedized repeater may be arranged in a manhole, a second repeater may be arranged on a power line pole, a third repeater may be arranged in another manhole, and then a fourth repeater may be arranged on another power line pole. As long as the repeater spacing is set at the predetermined, desirable, and/or optimal distance, the mixed configuration of configuration 600 may achieve the same or similar advantages of the configurations 300, 400, and 500 described above.

It may be understood that the ruggedized repeaters may be arranged, placed, installed, or configured on any suitable object or structure (manmade or otherwise) that can provide or allow predetermined spacing between the repeaters. Moreover, although the spacing configurations 300, 400, 500, and 600 were described with respect to terrestrial optical communication systems, the present disclosure is not limited thereto and may be similarly implemented in underwater environments, such as at least portions of an optical communication system configured in shallow waters.

Herein, a novel and inventive techniques for an improved repeater and optimized repeater spacing are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method, comprising:

arranging a plurality of optical repeaters equally spaced along a portion of a bidirectional optical transmission path to transmit optical information signals, each optical repeater having at least a first and second optical amplifiers to accommodate signal amplification along the bidirectional transmission path in a first direction and a second direction opposite the first direction, wherein each of the optical amplifiers are configured to have the same or nearly the same optical gain characteristics, wherein the repeaters are equally spaced based on a predetermined value of signal loss associated with first and second optical amplifiers in each of the plurality of optical repeaters.

2. The method of claim 1 wherein the plurality of repeaters are disposed on a corresponding plurality of utility poles.

3. The method of claim 1, wherein the plurality of repeaters are disposed in a corresponding plurality of manholes.

4. The method of claim 1, wherein a first portion of the plurality of repeaters are disposed on a corresponding number of utility poles and a second portion of the plurality of repeaters are disposed in a corresponding number of manholes.

5. The method of claim 1, wherein the first, second, and third optical repeaters are ruggedized repeaters.

6. The method of claim 1, wherein the each of the first and second optical amplifiers in each of the plurality of optical repeaters are single stage amplifiers.

7. An optical transmission system, comprising:

an optical transmission cable;

a first ruggedized optical repeater positioned at a first location along the optical transmission cable, a second ruggedized optical repeater positioned at a second location along the optical transmission cable a first distance from the first ruggedized repeater; and a third ruggedized optical repeater positioned at a third location along the optical cable a second distance from the second ruggedized optical repeater, each of the ruggedized optical repeaters including a first and second optical amplifiers, wherein the first distance between the first ruggedized optical repeater and the second ruggedized optical repeater is equal to the second distance between the second ruggedized optical repeater and the third ruggedized optical repeater, wherein the first and second distances are based on a signal loss between the first ruggedized optical repeater and the second ruggedized optical repeater, wherein the first and second distance is a predetermined, predefined, or preselected distance according to a set value of signal gain associated with the first and second amplifiers.

8. The system of claim 7, wherein the first location is a first utility pole; the second location is a second utility pole; and the third location is a third utility pole.

9. The system of claim 7, wherein the first location is a first manhole, the second location is a second manhole; and the third location is a third manhole.

10. The system of claim 7, wherein the first location is a first utility pole, the second location is a first manhole; and the third location is a second utility pole.

11. The system of claim 7, wherein the first, second, and third optical ruggedized repeaters are each single stage amplifiers.

12. The system of claim 7, wherein the optical transmission cable is a single mode fiber optical cable.

* * * * *